United States Patent [19]

Takabayashi et al.

[11] Patent Number: 5,778,738
[45] Date of Patent: Jul. 14, 1998

[54] TWO-MASS TYPE OF FLYWHEEL DEVICE

[75] Inventors: Akira Takabayashi; Yoshihisa Sugimura; Toshihide Aoki; Tomohiko Tsuchiya; Seiji Makita, all of Hamamatsu, Japan

[73] Assignee: Kabushiki Kaisha Yutaka Giken, Hamamatsu, Japan

[21] Appl. No.: 694,320

[22] Filed: Aug. 8, 1996

[30] Foreign Application Priority Data

| Aug. 31, 1995 | [JP] | Japan | 7-224228 |
| Aug. 31, 1995 | [JP] | Japan | 7-224252 |
| Aug. 31, 1995 | [JP] | Japan | 7-224274 |
| Aug. 31, 1995 | [JP] | Japan | 7-224309 |
| May 28, 1996 | [JP] | Japan | 7-133719 |

[51] Int. Cl.$^6$ .............. F16D 3/14; F16D 13/60; F16F 15/12
[52] U.S. Cl. .............. 74/574; 74/572; 74/573 F; 192/70.17
[58] Field of Search ............ 74/572–574; 192/70.17, 192/208; 464/68

[56] References Cited

U.S. PATENT DOCUMENTS

| 4,254,847 | 3/1981 | Kamman et al. | 74/574 X |
| 4,946,420 | 8/1990 | Jackel | 464/7 |
| 5,125,872 | 6/1992 | Reik | 464/67 |
| 5,160,007 | 11/1992 | Reik et al. | 192/70.17 |
| 5,293,977 | 3/1994 | Friedmann | 192/70.17 |
| 5,493,936 | 2/1996 | Stockmann et al. | 74/573 F |
| 5,617,940 | 4/1997 | Fukushima et al. | 192/70.17 |
| 5,636,553 | 6/1997 | Gobel et al. | 74/574 |

FOREIGN PATENT DOCUMENTS

| 3-7628 | 2/1991 | Japan |
| 5-22900 | 3/1993 | Japan |
| 5-22901 | 3/1993 | Japan |
| 5-71587 | 3/1993 | Japan |
| 5-133438 | 5/1993 | Japan |
| 5-52399 | 7/1993 | Japan |

*Primary Examiner*—Vinh T. Luong
*Attorney, Agent, or Firm*—Nikaido, Marmelstein, Murray & Oram LLP

[57] ABSTRACT

The rotation of a first flywheel of a two-mass type of flywheel device is transmitted to a second flywheel via springs. Frictional connecting portion having a friction plate is provided between the first flywheel and the springs. A driven plate integral with the second flywheel is provided between the springs and the second flywheel. The friction plate is fitted at one end thereof to a cylindrical portion formed on a diametrically inner side of the first flywheel and is frictionally engaged with the first flywheel. The friction plate is engaged at the other end thereof with the springs. A spring holding plate is disposed to define an oil chamber together with the first flywheel for containing therein the springs, the frictional connecting portion, and the driven plate. The first flywheel and the spring holding plate are formed by pressing metallic plate members and the first flywheel and the spring holding plate are welded together at their peripheries for hermetically sealing the oil chamber.

9 Claims, 9 Drawing Sheets

IRRADIATION ANGLE OF LASER BEAM $a$ (3kw, 1.7m/min.)
PLATE THICKNESS t1=2.9, t2=2.6)

TWO-MASS TYPE OF FLYWHEEL DEVICE

BACKGROUND OF THE INVENTION

1. Field of the Invention

The present invention relates to a two-mass type of flywheel device, which is provided between a crank shaft of an engine of a vehicle such as a motor vehicle and a power transmission device in order to smooth the rotational vibrations at a low speed operation of the engine. It also relates to a method of forming the two-mass type of flywheel.

2. Description of the Related Art

Conventional two-mass type of flywheel devices are disclosed, for example, in Japanese Published Unexamined Utility Model Registration Applications Nos. 22900/1993 and 22901/1993. In each of these conventional flywheel devices, a first flywheel, a ring gear, a spring cover, a second flywheel, etc., which are disposed as a mass member on the side of an engine of a vehicle such as a motor vehicle, are aligned by fitting them in a concentric relationship with each other. If the alignment is inaccurate, the center of gravity becomes eccentric, giving rise to vibrations. Therefore, the inner circumferential surface and the peripheral surface of a fitted portion must be finished with a high degree of accuracy by cutting, grinding, or the like. This kind of machining work to a workpiece results in an expensive product. It also requires that a means or a mark for positioning in the circumferential direction be separately provided. Further, this kind of construction requires a large number of constituent parts or members and therefore becomes complicated. In addition, since the means for the above-described machining the constituent parts is not suitable for mass production, the products produced thereby necessarily becomes high in cost.

Further, this kind of conventional flywheel device also has the following construction. Namely, inside the first flywheel there are disposed an oil damper and a buffer spring, and via these elements the first flywheel is connected to the second flywheel. The first flywheel is subjected to a cutting work at various portions, and complicated oil passages are communicated with the oil damper. The main portion of the second flywheel is made of a thick disklike material by machining a side portion thereof to form therein an oil chamber, a spring chamber, a boss portion, or the like. A stepped peripheral surface for fitting thereinto a ring gear is provided in an external periphery of the second flywheel. This kind of construction requires boring, cutting of an external surface, and other cutting work of the disklike material. The flywheel thus manufactured is therefore poor in productivity and necessarily becomes higher in cost.

In view of the above-described disadvantages of the conventional flywheel device, the present invention has an object of providing a flywheel device which is superior in productivity, by forming the main constituting elements by pressing and welding, and which has a damping or attenuating function.

SUMMARY OF THE INVENTION

In order to attain the above and other objects, according to the present invention, there is provided a two-mass type of flywheel device in which: the rotation of a first flywheel is transmitted to a second flywheel via spring means; frictional connecting means having a friction plate is provided between the first flywheel and the spring means; a driven plate integral with the second flywheel is provided between the spring means and the second flywheel; the friction plate being fitted at one end thereof to a cylindrical portion formed on a diametrically inner side of the first flywheel and fictionally engaged with the first flywheel, and being engaged at the other end thereof with the spring means; the flywheel device comprising a spring holding plate disposed to define an oil chamber together with the first flywheel for containing therein the spring means, the frictional connecting means, and the driven plate; characterized in: that the first flywheel and the spring holding plate are formed by pressing metallic plate members; and that the first flywheel and the spring holding plate are welded together at their peripheries for hermetically sealing the oil chamber.

Because pressing is employed in the manufacture of the first flywheel, the productivity is high.

In case the spring holding plate is smaller in diameter than that of the first flywheel, the welding is preferably done by continuous laser beam welding over an entire periphery of the spring holding plate such that a welding portion of a tapered ring shape is formed into a side surface of the first flywheel.

The angle of inclination of the laser beam relative to a side surface of the first flywheel is approximately between 5°–60°, preferably between 8°–45°.

In case the spring holding plate is substantially equal in diameter to that of the first flywheel, the welding is preferably done by laser beam welding by irradiating a laser beam in at least one of directions from a side of the spring holding plate towards the first flywheel and from the first flywheel towards the spring holding plate.

Preferably, one end of the friction plate is fitted to the cylindrical portion and is urgingly abutted with a friction surface of the first flywheel via a friction ring.

The two-mass type of flywheel device preferably further comprises a bearing fitted by its outer ring on a second cylindrical portion formed on a diametrically inner side of the cylindrical portion and by its inner ring on a hub of the second flywheel, and a diametrically inner end of the first flywheel has a flange for abutting axially one end of the bearing. The flange is formed by pressing in continuing relationship with the second cylindrical portion and the other end of the bearing abuts a push plate riveted to the first flywheel.

The two-mass type of flywheel device preferably further comprises: a driving plate connected to a crank shaft of an engine of a vehicle such as a motor vehicle;

and a positioning mechanism for aligning the first flywheel relative to the driving plate; wherein the positioning mechanism comprises positioning projections, each being a hollow projection protruded, by pressing, from one of the driving plate and the first flywheel near the periphery thereof, each of the hollow projections having a length sufficient to pass through a positioning hole provided in the other of the driving plate and the first flywheel.

The two-mass type of flywheel device preferably further comprises: a driving plate connected to a crank shaft of an engine of a vehicle such as a motor vehicle; wherein the driving plate is provided with fixing holes on a periphery thereof, the driving plate being disposed on a side away from the second flywheel relative to the first flywheel; and a ring gear fixed to a side of the spring holding plate together with the driving plate.

BRIEF DESCRIPTION OF THE DRAWINGS

The above and other objects and the attendant advantages of the present invention will become readily apparent by

Figure 1:
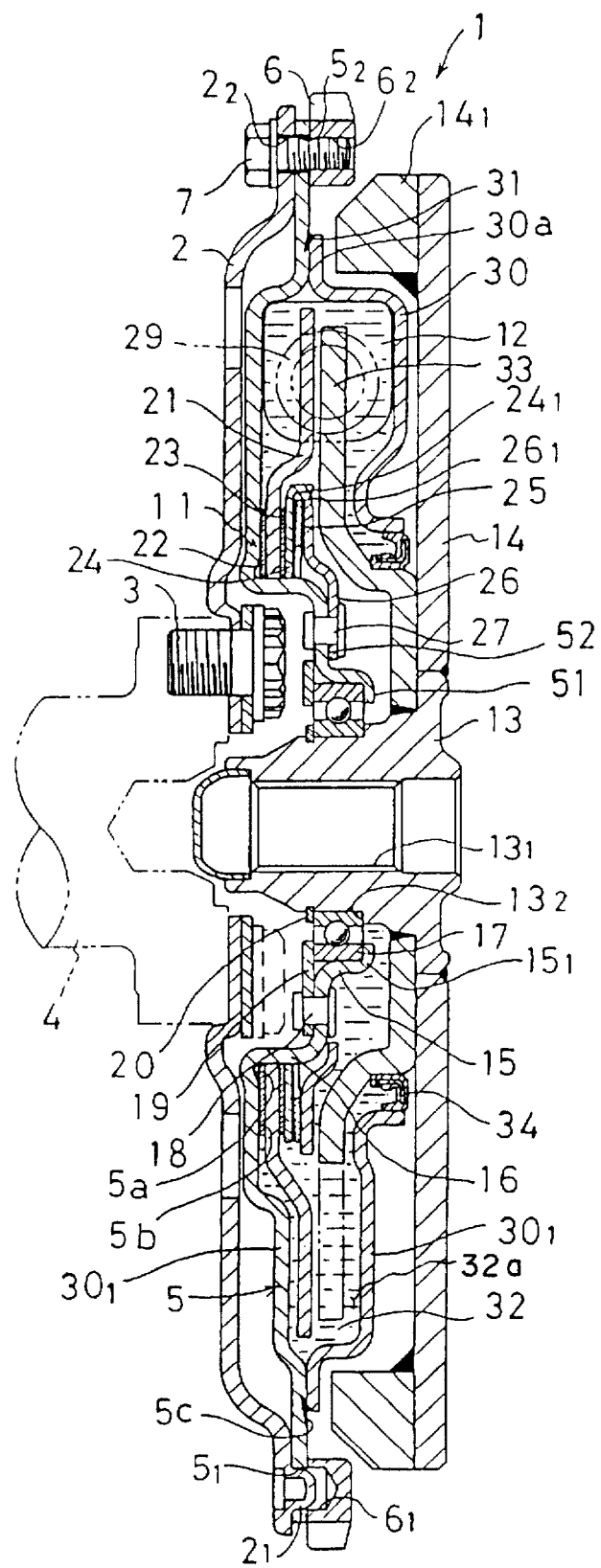
Figure 2:
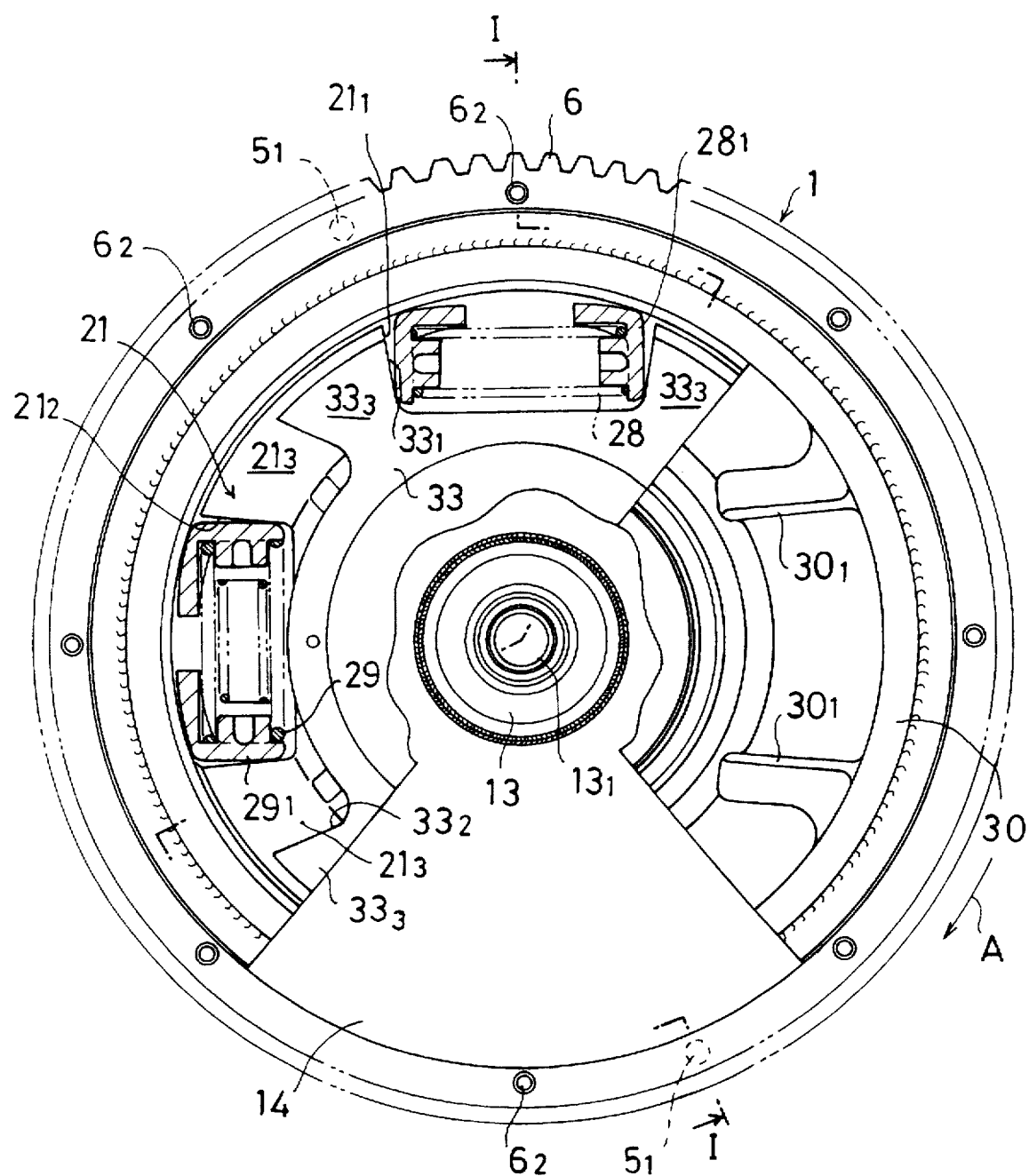
Figure 3:
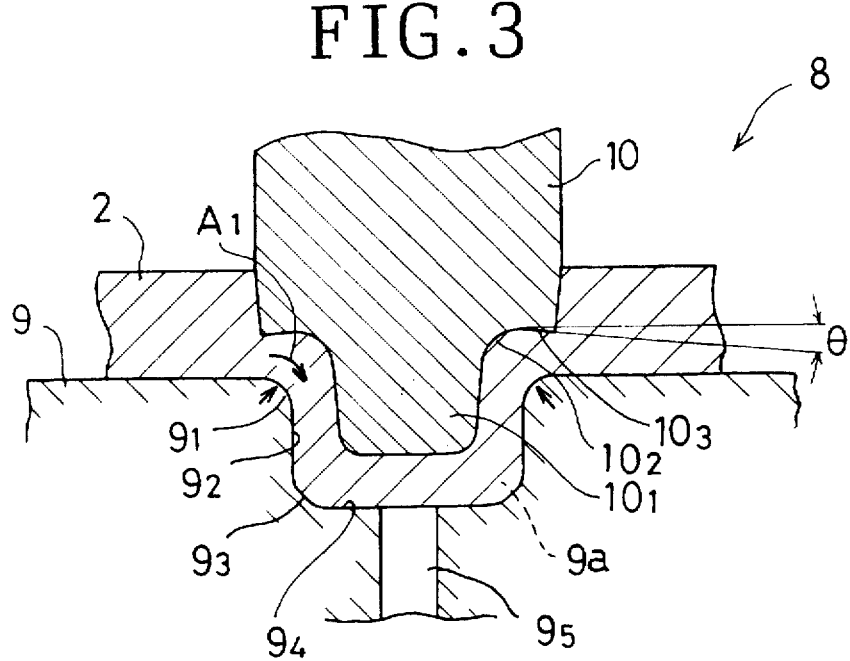
Figure 4:
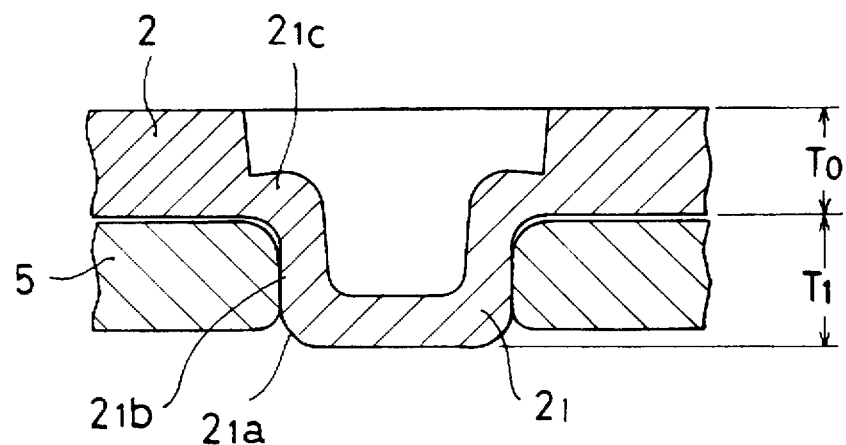
Figure 5:
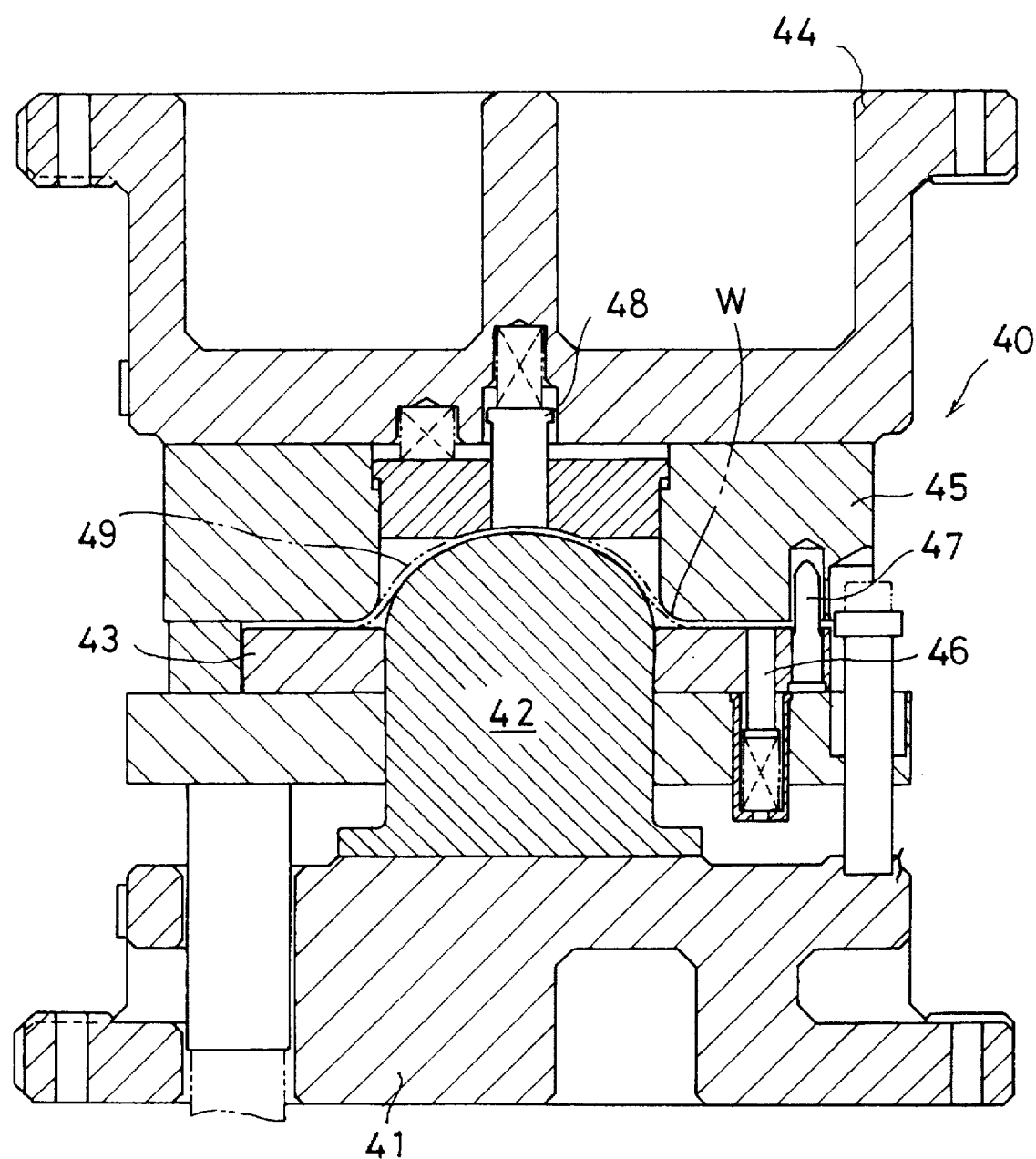
Figure 6:
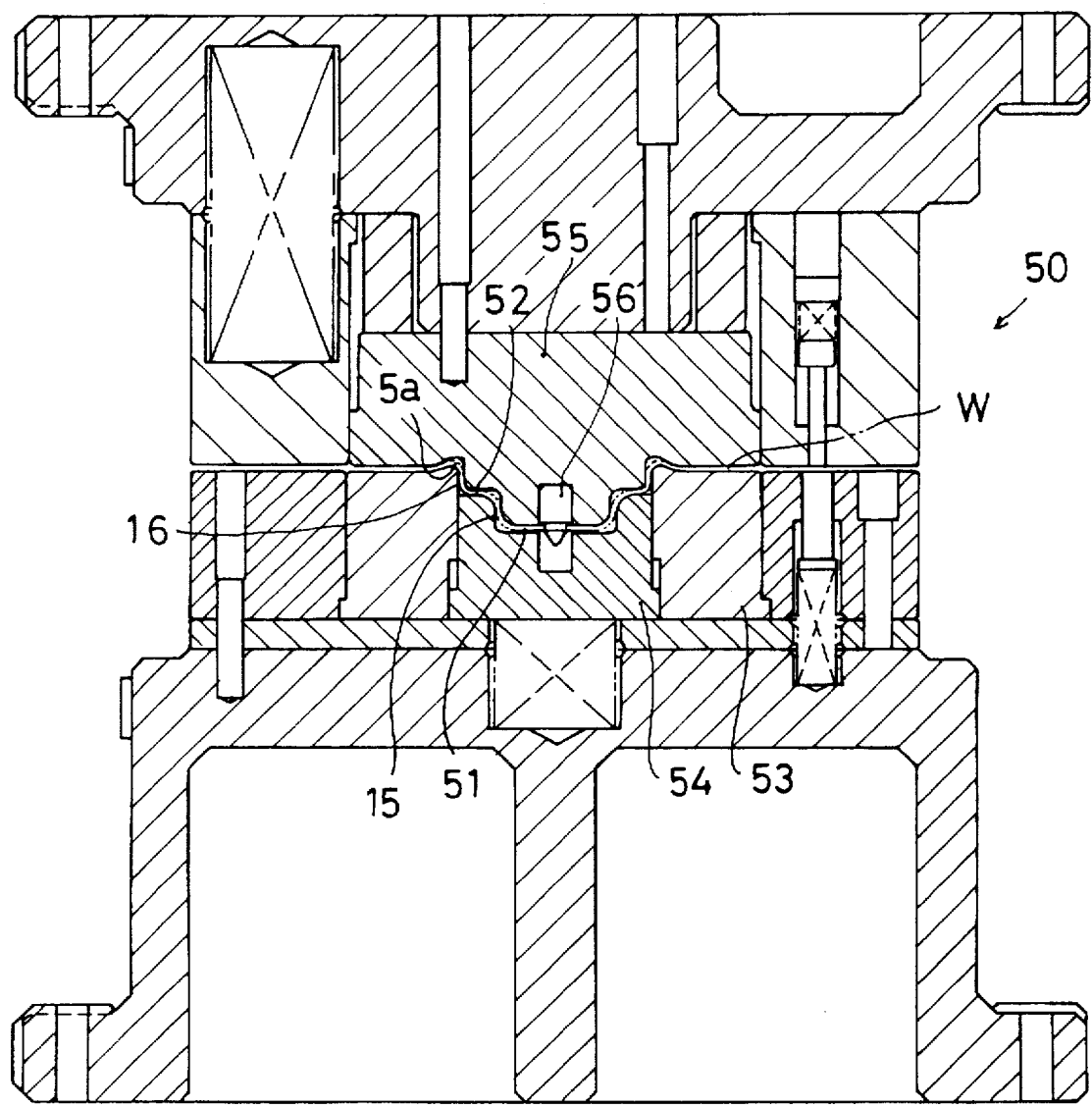
Figure 7:
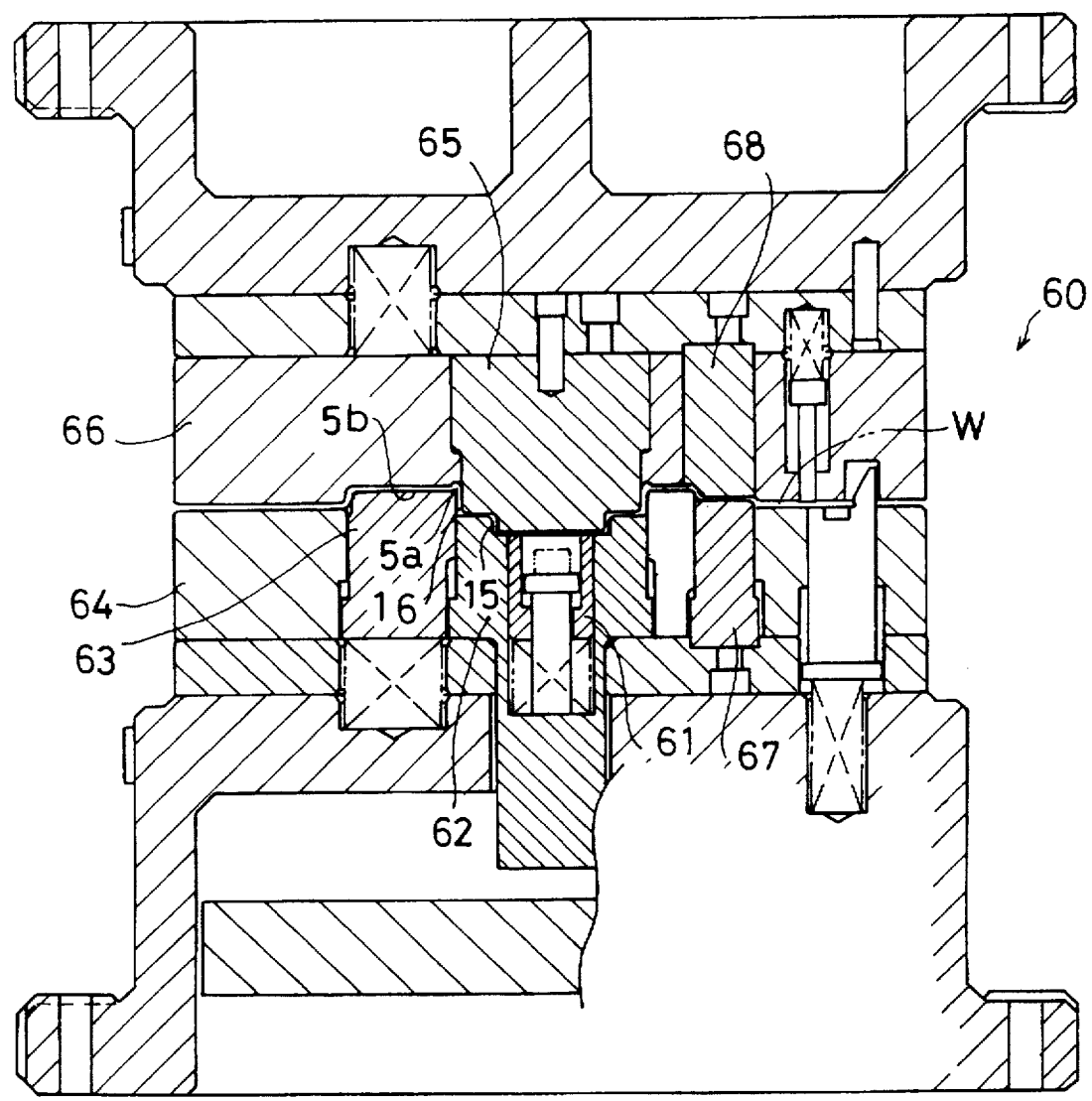
Figure 8:
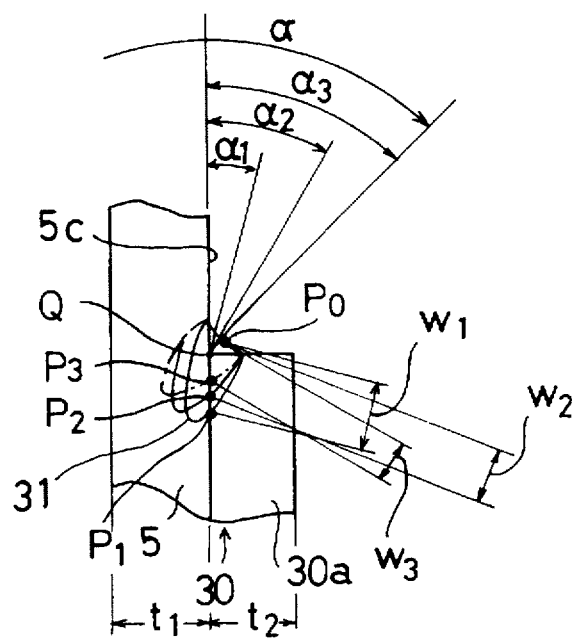
Figure 9:
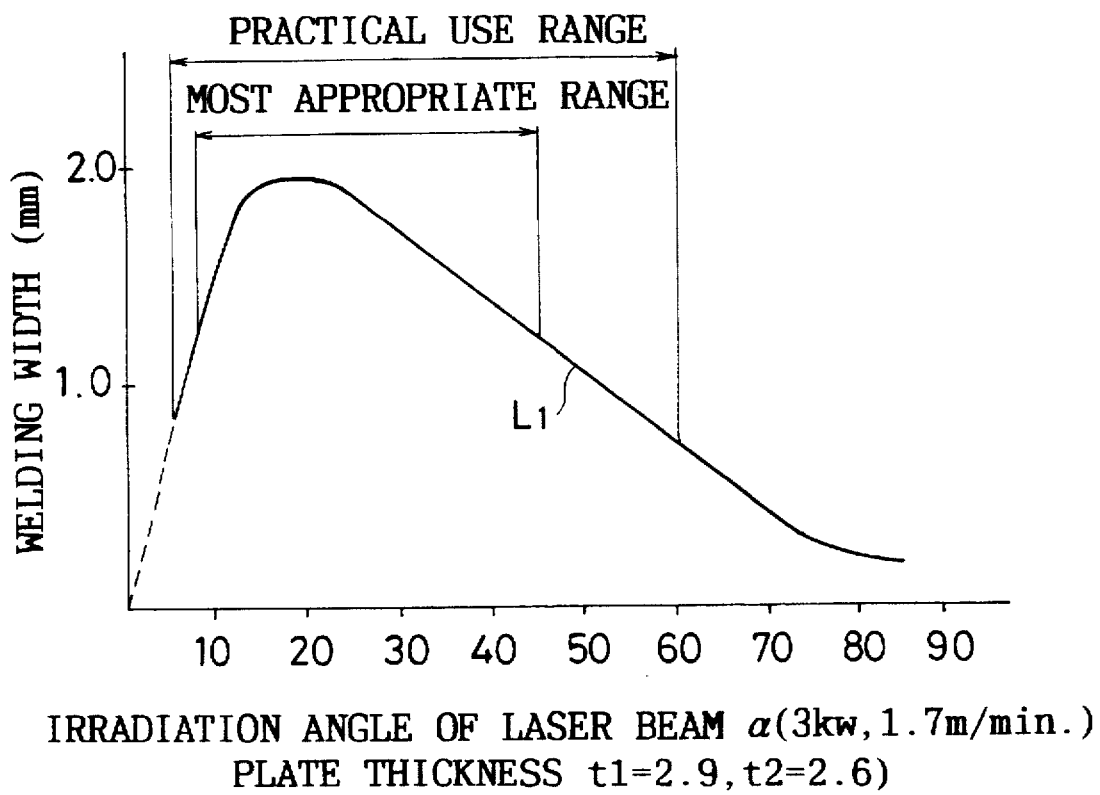
Figure 10:
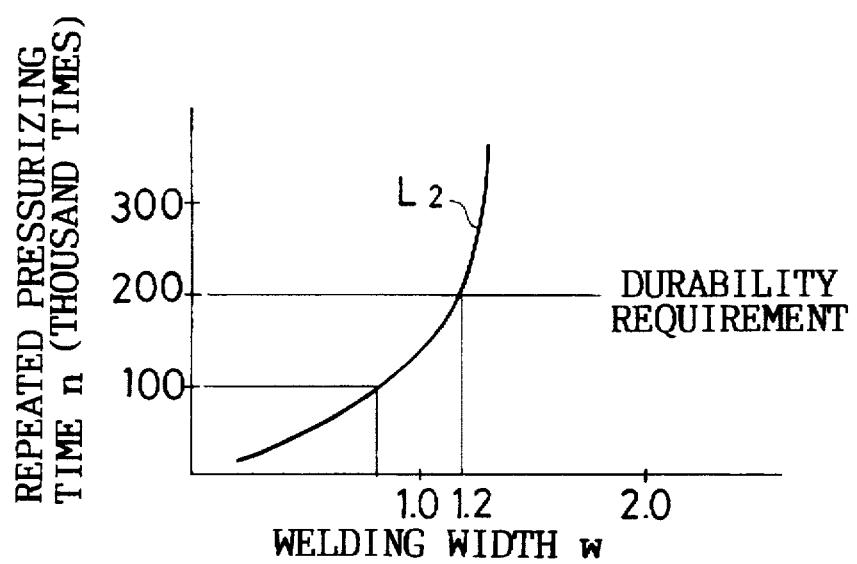
Figure 11:
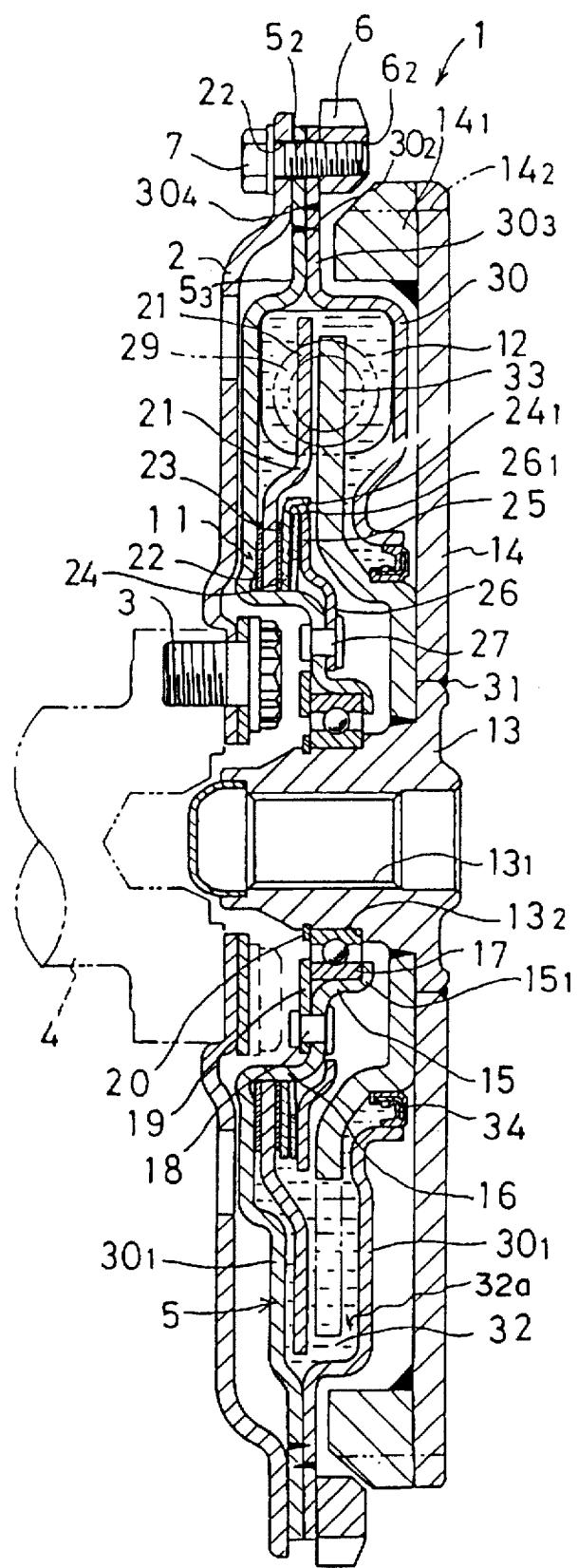

3 reference to the following detailed description when considered in conjunction with the accompanying drawings wherein:

FIG. 1 is a vertical cross-sectional view of one example of a two-mass type of flywheel device according to the present invention taken along line 1—1 of FIG. 2;

FIG. 2 is a front view thereof;

FIG. 3 is a vertical cross-sectional view of an important portion of a metallic mold for forming a positioning projection of the flywheel device;

FIG. 4 is a vertical cross-sectional view of a positioning projection;

FIG. 5 is a vertical cross-sectional view of a press for performing the first step of forming a first flywheel of the flywheel device;

FIG. 6 is a vertical cross-sectional view of a press for performing the second step of forming the first flywheel of the flywheel device;

FIG. 7 is a vertical cross-sectional view of a press for performing the third step of forming the first flywheel of the flywheel device;

FIG. 8 is a vertical cross-sectional view of an important portion of the welding portion;

FIG. 9 is a diagram showing the relationship between the welding width and the irradiation angle of the laser beam;

FIG. 10 is a diagram showing the relationship between the welding width and the durability; and FIG. 11 is a vertical cross-sectional view of another example of the two-mass type of flywheel device of the present invention.

DETAILED DESCRIPTION OF PREFERRED EMBODIMENTS

Detailed explanation will now be made about an embodiment of the present invention.

In FIGS. 1 and 2, numeral 1 denotes a two-mass type of flywheel device. Numeral 2 denotes a driving plate which is fixed with bolts 3 to a crank shaft 4 of an engine of a vehicle such as a motor vehicle. Numeral 5 denotes a first flywheel which forms the main portion of a first mass member. Numeral 6 denotes a ring gear which is driven by a pinion and a starting motor (both not illustrated) for starting the engine.

The driving plate 2 is provided with positioning projections $2_1$ at two to four positions near a periphery (i.e., an outer circumference) thereof and has bored therethrough bolt holes $2_2$. The first flywheel 5 has bored therethrough positioning holes $5_1$ and bolt holes $5_2$. The ring gear 6 has positioning holes $6_1$ and threaded holes $6_2$. Once the positioning projections $2_1$ are fitted into the positioning holes $5_1$, $6_1$ to thereby align the three members of the driving plate 2, the first flywheel 5, and the ring gear 6, bolts 7 are threaded to the threaded holes $6_2$ by inserting them into the bolt holes $5_2$, thereby integrally fixing them together.

The positioning projections $2_1$ of the driving plate 2 are formed by a metallic mold 8 as shown in FIG. 3. In a die 9 of the metallic mold 8, there is provided a kaliber (or a pass) $9a$ having a chamfered round portion $9_1$, a cylindrical portion $9_2$, a tapered portion $9_3$, a bottom portion $9_4$, and an air vent hole $9_5$. In a punch 10 of the metallic mold 8, there are provided the following in sequence from the bottom (i.e., a front end as seen from a viewpoint of its movement) upwards as seen in FIG. 3, i.e., a chamfered projected portion $10_1$, a round portion $10_2$ at the base of the projected

4 portion $10_1$, and a ringlike tapered surface $10_3$ which continues from the round portion $10_2$ and whose periphery has an inclination angle of θ protruding towards the front end of the projected portion $10_1$.

When the driving plate 2 as a workpiece is placed on top of the die 9, and the plate surface of the driving plate 2 is pressed by the punch 10, the body of the driving plate 2 is forced by the projected portion $10_1$ into the kaliber $9a$. As a result, there are formed, as shown in FIG. 4, a tapered guide portion $2_1a$, a cylindrical portion $2_1b$, and a flanged base portion $2_1c$. In this pressing work, the periphery of the base portion $2_1c$ is compressed by the tapered portion $10_3$ of the punch 10 to a larger extent than is an inner circumference of the base portion $2_1c$. The metal on the periphery of the base portion $2_1c$ is therefore pushed towards the inner circumference into the cylindrical portion $2_1b$ in the direction shown by an arrow $A_1$ in FIG. 3, whereby the cylindrical portion $2_1b$ is formed in a denser or thicker condition. In addition, since each of the positioning projection $2_1$ is hollow, the amount of projection can be made large such that the amount of projection $T_1$ becomes about 1.2 $T_0$ relative to the thickness of the plate $T_0$.

As described above, the length of the positioning projection $2_1$ can be formed large and since the peripheral shape can be formed at a higher accuracy. Therefore, three members of the driving plate 2, the first flywheel 5, and the ring gear 6 can be accurately aligned with each other in a concentric manner when the projections $2_1$ are fitted into the positioning holes $5_1$, $6_1$ of the first flywheel 5 and the ring gear 6, respectively.

The first flywheel 5 is manufactured in the processes or steps explained with reference to FIGS. 5 through 7. FIG. 5 shows a press 40 for performing the first working process or step. In the Figure, numeral 41 denotes a base of the press 40, numeral 42 denotes a punch having a hemispherical pressing surface, and numeral 43 denotes a clamping piece which is elastically urged upwards. A die 45 is attached to an upper pressing member 44. Numeral 46 denotes a knock-out pin and numeral 47 denotes a positioning pin and numeral 48 denotes a holding member.

The workpiece W which is made of a mild steel plate is pressed towards the punch 42 while being held between the clamping piece 43 and the die 45, whereby the spherical portion 49 is formed.

FIG. 6 shows a press 50 for performing the second step. The spherical portion 49 formed in the first step is placed upside down, and the portion to constitute a ring groove $5a$ and cylindrical portions 15, 16 as well as stepped portions 51, 52 are roughly formed in two stepped shapes. In FIG. 6, numeral 53 denotes an outer die, and numeral 54 denotes an inner die which is elastically urged upwards inside the outer die 53. In a punch 55 there are formed die surfaces apart from the die surfaces of the dies 53, 54 with a clearance larger than the plate thickness. A positioning pin 56 is provided in the center thereof.

When the spherical portion 49 of the workpiece W is pressed from an upper end thereof by the press 50, the workpiece W is deformed due to the deformation through the positional conversion (i.e., upside down) and the deformation through the stepping work. However, since the workpiece W gives rise to little or no new elongation, the formation of two steps can be made easily.

FIG. 7 shows a press 60 for performing the third step. A lower die is made up by fitting together ring-like dies 62, 63, 64 around a clamp 61. An upper die is made up by fitting an inner punch 65 and an outer punch 66 together. In the Figures, numerals 67, 68 denote punches for forming a stepped portion to support a spring bed for a shock-absorbing spring or a buffer spring which is described hereinafter.

By pressing the workpiece W with this press 60, the forming work of the first flywheel 5 is finished, whereby the cylindrical portions 15, 16 are formed, and the ring groove 5a and a friction surface 5b are formed. At the ring groove 5a, since the deformation takes place from a condition of a large radius of curvature of FIG. 6 to a condition of small radius of curvature of FIG. 7, there will occur a function of increasing the thickness of the plate. The ring groove 5a is thus prevented from becoming smaller in thickness, resulting in a larger strength. Further, the flat friction surface 5b is formed by the pressing by the die 63 and the outer punch 66.

In the first flywheel 5 there is provided a frictional connecting means 11 which utilizes the friction surface 5b, the cylindrical portions 15, 16 or the like. The first flywheel 5 is connected via the frictional connecting means 11 and a buffer spring 12 (also called spring means 12) to a driven plate 33 which is integral with a hub 13. To the hub 13 there is fixed a second flywheel 14 which constitutes a main portion of a second mass member. Numeral $13_1$ denotes a screw hole for connecting thereto a clutch and numeral $14_1$ denotes a mass.

A bearing 17 is held inside the radially inner or second cylindrical portion 15. The first flywheel 5 is supported on the hub 13 via the bearing 17. For holding the bearing 17 in position, an outer ring of the bearing 17 is held (or pinched) by a flange $15_1$ which extends from the second cylindrical portion 15 and a push plate 19 which is fixed by rivets 18. An inner ring of the bearing 17 is held by a stepped portion $13_2$ of the hub 13 and a C-ring 20.

The frictional connecting means 11 is provided to attenuate or damp the rotational vibrations to be transmitted from the engine to the buffer spring 12. The connecting portion 11 is fitted onto the outer cylindrical portion 16 which is on the radially outer side of the first flywheel 5. A friction ring 22, an inner end of a friction plate (or a driven friction plate) 21 and a friction ring 23 are sequentially fitted onto the outer of first cylindrical portion 16. One 22 of the fictional rings contacts the first flywheel 5 and the other 23 of the friction rings contacts a washer 24. On the washer 24 there are placed a disc spring 25 and a pushing plate 26 in sequential contact with each other. The pushing plate 26 is fixed to the first flywheel 5 with rivets 27, and an elastic urging force of the disc spring 25 operates on each of the contact surfaces. At this time, the inner edge of the left (as seen in FIG. 1) surface of the friction ring 22 faces, or lie opposite to, the ring groove 5a. But since the ring groove 5a functions as a clearing groove, there occurs no partial contact of the friction ring 22 with the contact surface. Further, since the washer 24 and the pushing plate 26 are both provided on their peripheries with claws $24_1$, $26_1$ for engagement with each other, the rotation of the first flywheel 5 is transmitted via the friction plates 22, 23 to the driven friction plate 21.

As shown in FIG. 2, the driven friction plate 21 is provided with two kinds of C-shaped dented portions $21_1$, $21_2$. Between these two dented portions there is formed a tongue piece $21_3$. In one $21_1$ of the dented portions there is held a weak spring 28, and in the other $21_2$ of the dented portions there is held a strong double spring 29. These two springs 28, 29 correspond to those shown as the spring means 12 in FIG. 1. Numerals $28_1$, $29_1$ denote spring bases which are fitted onto both ends of the respective springs. These spring bases $28_1$, $29_2$ contact the tongue piece $21_3$.

As is clear from FIGS. 1 and 2, a spring holding plate 30, which covers one side of the springs 28, 29 and also holds the spring bases $28_1$, $29_1$ in cooperation with the dented portions $21_1$, $21_2$, is welded to the first flywheel 5 at a weld line 31. The spring holding plate 30 is provided with two sets of inwardly-looking stepped portions $30_1$, $30_1$, each sets in a pair. Similar stepped portions $30_1$, $30_1$ are also provided on the side of the first flywheel 5. As described above, these stepped portions $30_1$ hold the spring base $29_1$ of the strong spring 29 together with the dented portion $21_2$. Further, an oil chamber 32 for holding therein grease 32a is formed by the first flywheel 5 and the spring holding plate 30.

Before welding the spring holding plate 30, a driven plate 33 is welded to the hub 13. In the driven plate 33 there are provided large and small C-shaped dented portions $33_1$, $33_2$, thereby forming a tongue piece $33_3$. Since the second flywheel 14 is welded to the hub 13 which is integral with the driven plate 33, the driven plate 33 also functions as a part of the mass of the second flywheel 14. Reference numeral 34 denotes an oil seal to keep the oil chamber 32 airtight (or fluid-tight).

When the first flywheel 5 is rotated in the direction of an arrow A shown in FIG. 2, the strong spring 29 is pushed by the stepped portions $30_1$ and, consequently, the driven friction plate 21 is also rotated in the direction of the arrow A. The grease 32a filled in the oil chamber 32 rises in pressure due to a centrifugal force and will therefore be pressurized towards the periphery. However, since the weld line 31 is closed airtight, the leak of the grease can be prevented.

The springs 28, 29 are pushed by the tongue piece $21_3$ in the direction of the arrow A and the weak spring 28 immediately transmits the torque to the toque piece $33_3$ of the driving plate 33. The strong spring 29, however, is not brought into contact with the tongue piece $33_3$, but only the weak spring 28 is compressed. When the transmitted torque further increases, the strong spring 29 comes into contact with the tongue piece $33_3$ to thereby transmit the torque to the tongue piece $33_3$. When the rotational speed varies, the frictional connecting means 11 gives rise to slipping due to expansion and contraction of the springs 28, 29, whereby a vibration attenuation function due to the friction force occurs.

The vibration damping function of the flywheel 1 is the same as that in the prior art. It occurs due to a combined effect of the damping function of the frictional connecting means 11, shock-absorbing or buffer function of the springs 28, 29, viscous resistance which occurs between the grease in the oil chamber 32 and the springs 28, 29 and spring bases $28_1$, $29_1$, and the dynamic damping function by the first flywheel 5 and the second flywheel 14, or the like. In order to cause this vibration damping function to effectively occur, the assembly made by assembling the members from the first flywheel 5 through the second flywheel 14 must be fixed to the driving plate 2 both in a coaxial relationship and in a predetermined phase relationship in the circumferential direction to thereby prevent the occurrence of the vibrations.

According to the present invention, when the driving plate 2 or the mass member is formed by pressing, the positioning projections can be formed simultaneously. Therefore, it is not necessary to use a separate member for the positioning projections, resulting in an inexpensive manufacturing cost. In addition, since the positioning projections are present near the periphery, they can be easily observed by the eye. The assembling of both the members is therefore easy and the positional error will not be extended.

On a side surface of the first flywheel 5 which constitutes the first mass member, there is disposed a flange 30a which is formed in a periphery of the spring holding plate 30, one on top of the other so as to form a step. The connecting surface of both the members is welded over the entire circumference at the weld line 31. The oil chamber 32 is thus formed inside.

The spring holding plate 30 is also formed, like the first flywheel 5 and other members, by pressing a thin plate out of consideration of the workability, the weight, and the economy. The weld line 31 must be strong enough to withstand the pressure to occur inside the oil chamber 32.

However, since the first flywheel 5 and the spring holding plate 30 are made of thin plates and are placed one on top of the other so as to form the step on the periphery of the spring holding plate 30, it is difficult to weld them air tight. However, according to the present invention, by adopting laser welding and also by adopting the welding arrangement as shown in FIG. 8, a welding construction having a desired effect can be obtained.

FIG. 8 shows a condition in which welding is made between the first flywheel 5 of a plate thickness of 2.9 mm and the spring holding plate 30 of a plate thickness of 2.6 mm with a 3 kw laser welding machine at a welding speed of 1.7 m/min. The angle $\alpha$ is defined herewith as the weld axis and is identical to an inclination angle of the laser beam relative to the side surface 5c of the first flywheel 5. The smaller becomes the angle $\alpha$, the closer the laser beam becomes to the side surface 5c. Let the fillet or corner portion to be formed by the side surface 5c and the peripheral surface of the spring holding plate 30 be Q. The laser beam is irradiated through the fillet Q. The side on the surface of the weld line 31 is swelled or raised a little above the fillet Q, the center of the surface being at the point $P_0$.

When the irradiation angle is varied to $\alpha_1$, $\alpha_2$, $\alpha_3$ by an increment of 15°, the border of the weld line 31 in the side surface 5a varies as shown by points $P_1$, $P_2$, $P_3$, respectively. The distance between the point $P_0$ to the points $P_1$–$P_3$ corresponds to the respective welding or deposition widths or depths. Each deposition width is represented as $w_1$, $w_2$, $w_3$. The larger this deposition width is, the larger the air tightness and the welding strength become.

FIG. 9 shows the relationship between the welded or deposited portion w and the irradiation angle a of the laser beam by line $L_1$. If the angle a in FIG. 8 is smaller than 5°, the welding strength is likely to become small due to a lack in the amount of fusion on the side of the side surface 5c. If the angle a is larger than 5°, the deposition width w becomes large. The deposition width w becomes approximately a maximum value of 1.9 mm at 15° through 25° and then becomes gradually small. At an angle $\alpha$ of 5° through 6°, the deposition width w becomes larger than about 0.8 mm, and 1.2 mm at 8° through 45°.

Tapered ringlike weld line 31 are formed in the workpieces welded at various irradiation angles, and the oil chambers 32 are formed inside. FIG. 10 shows results of safety tests by subjecting the oil chambers 32 to repeated by hydraulic pressure of 10 kgf/cm$^2$. The right side of the line $L_2$ is the safety zone. The safe welding width at the pressurizing time n of one-hundred thousand times is about 0.8 mm, and the safe welding width at the pressurizing time n of two-hundred thousand times is about 1.2 mm. If the range of the pressurizing time n is in the range of above one-hundred thousand times, it can be considered to be a range of practical use or service, and if it is above two hundred-thousand times, it is considered to be a most appropriate range. In FIG. 9, the range of practical use falls within 5° through 60°, and the angle of 8° through 45° becomes the most suitable range.

FIG. 11 shows another example of the present invention.

The two-mass type of flywheel device shown in FIG. 11 is different from that shown in FIGS. 1 and 2 in the construction of connection between the first flywheel 5 and the spring holding plate 30, particularly the construction of the flange of the spring holding plate 30, the other portions being substantially the same with each other. Therefore, the same numerals are affixed to the same parts/members, and their detailed explanations are omitted. Front view of FIG. 11 is omitted because it is substantially the same as FIG. 2.

Also in this example, the first flywheel 5 and the spring holding plate 30 are formed by pressing a plate member so that flanges $5_3$, $30_3$ are formed on the respective peripheries. Unlike the one shown in FIGS. 1 and 2, the flange $30_3$ is formed to extend to substantially the same diameter as the flange $5_3$ of the first flywheel 5. As explained hereinafter, after required members or parts are mounted inside both the first flywheel 5 and the spring holding plate 30, the flanges $5_3$, $30_3$ are placed face to face and are continuously welded by seam welding over the entire peripheries thereof by laser beam in a direction of the depth of the flanges. The flanges $5_3$, $30_3$ are thus connected together airtight by the weld line $30_2$, $30_4$.

Prior to the welding of the spring holding plate 30, the driven plate 33 is mounted in position. This driven plate 33 is provided with large and small C-shaped dented portions $33_1$, $33_2$, thereby forming a tongue piece $33_3$. The driven plate 33 as welded to the hub 13 is placed side by side with the driven friction plate 21 so as to be coaxial via the interposed bearing 17. The dented portion $33_1$ is made to be coincident with the dented portion $21_1$ to thereby mount the weak spring 28 therein, and the strong spring 29 is mounted in the dented portion $21_2$. At this time, there exists a clearance between the strong spring 29 and the both ends of the dented portion $33_2$. Then, the spring holding plate 30 is welded at the welding portions $30_2$, $30_4$ by laser beam. The second flywheel 14 is thereafter welded to the hub 13. Since the driven plate 33 is also welded to the hub 13, the driven plate 33 constitutes the second mass member together with the second flywheel 14.

When the first flywheel 5 is rotated in the direction of the arrow A as shown in FIG. 2, the strong spring 29 is pushed in the same direction by the stepped portions $30_1$, $30_1$, and the driven friction plate 21 is pushed by the spring 29. The weak spring 28 is pushed by the stepped portion $21_1$, and the driven friction plate 21 is also rotated in the direction of the arrow A. The grease filled in the oil chamber 32 increases in pressure by the centrifugal force and is urged towards the periphery. However, since the weld line $30_2$, $30_4$ are airtight, the grease is prevented from leaking therefrom. The springs 28, 29 extend and contract inside the grease in the oil chamber 32 together with the spring bases $28_1$, $29_1$. As a result, the function of damping the vibrations is generated due to the viscous resistance of the grease.

The welding between the first flywheel 5 and the spring holding plate 30 may alternatively be done only at one of the weld line $30_2$, $30_4$. Further, the direction of irradiating the laser beam may be from the side of the spring holding plate 30 as in the weld line $30_4$ or from the side of the first flywheel 5 as in the weld line $30_2$.

When there is used an assembling means in which the first flywheel 5 is disposed on the lower side and the frictional connecting means 11, the springs 28, 29, the driven plate 33 that is integral with the hub 13, and the spring holding plate 30 are placed on top of the first flywheel 5 in sequence in the listed order, the welding can be performed by applying the laser beam from the side of the spring holding plate 30 to thereby form the weld line $30_4$. Then, the second flywheel 14 is fixed to the hub 13 at the weld line 31, whereby the assembling is finished. The welding of the other weld line $30_2$ may be performed at a later stage. If an outside diameter of the second flywheel 14 is smaller than the weld line $30_4$ as illustrated by an imaginary line $14_2$, the welding of the welding portion $30_4$ can be performed even if the second flywheel 14 is integrated in advance with the hub 13.

As is clear from the above explanations, according to the present invention, the frictional connecting means is provided between the first flywheel and the spring means. Therefore, it is possible to add the vibration damping function due to friction aside from the dynamic vibration damping function by the first flywheel and the second flywheel.

Further, since the first flywheel, the spring holding plate, or the like are formed by pressing, it can be cheaply manufactured in a large number and since, unlike the manufacturing by mechanical cutting, there occurs no chips, the step of their removal is not required.

Further, since the cylindrical portion and the flange are formed by pressing on an internal circumference of the first flywheel, and the outer ring of the bearing is held by the above members and the push plate. Therefore, the steps of cutting, caulking, or the like are not required, with the result that the machining and the assembling become extremely easy.

Since the positioning projections are formed by pressing, as compared with an arrangement in which positioning pins are mounted, there is an advantage in that the flywheel device can be manufactured in a smaller number of parts and steps at a smaller cost. Further, since the positioning projections are provided near the periphery of the flywheel device, the positioning projections and the positioning holes to cooperate therewith are located in such a position as is easily visible to the eye. Further, since the circumferential error is not extended, the members having these projections and holes can be assembled accurately and efficiently.

Further, the tapered ringlike weld line is formed by laser welding over an entire circumference to extend from the corner formed by the periphery of the flange and the side surface of the mass member towards the inside of the mass member and the flange. Therefore, even if both the members are made of thin plates, the weld line of a large welding width can be formed without causing damages to the base members. It follows that the airtight oil chamber with high pressure resistance can be obtained in simple and efficient working steps.

Further, since a flange is provided on the periphery of each of the first flywheel and the spring holding plate, and the two are placed one on top of the other for performing continuous seam welding by laser beam welding. Therefore, the welding can be done easily and both the flanges are surely kept airtight. There is no possibility that the oil therein leaks.

Further, the ring gear and the driving plate are fixed together to the two flanges of the first fly wheel and the spring holding plate, the rigidity of the flanges can be improved. Excess stresses that might otherwise occur on the weld line can be prevented.

It is readily apparent that the above-described two-mass type of flywheel device meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A two-mass type of flywheel device comprising:
   a first flywheel having a first cylindrical portion at a radially inwards position;
   a second flywheel coaxial to said first flywheel;
   spring means for rotationally connecting said first flywheel to said second flywheel;
   frictional connecting means having a friction plate between said first flywheel and said spring means;
   a driven plate affixed to said second flywheel between said spring means and said second flywheel;
   said friction plate being fitted at one end thereof onto said first cylindrical portion and frictionally engaged with said first flywheel, and being engaged at the other end thereof with said spring means;
   a spring holding plate disposed to define an oil chamber together with said first flywheel for containing therein said spring means, said frictional connecting means, and said driven plate;
   said first flywheel and said spring holding plate being pressed metallic plate members; and
   an inclined weld line joining a periphery of said spring holding plate to a side surface of said first flywheel hermetically sealing said oil chamber.

2. A two-mass type of flywheel device according to claim 1, wherein said spring holding plate has a smaller outer diameter than an outer diameter of said first flywheel, and wherein said weld line is a continuous laser beam generated weld line of 0.8 mm or more in deposition width extending over an entire periphery of said spring holding plate and having a tapered ring shape formed into a side surface of said first flywheel.

3. A two-mass type of flywheel device according to claim 2, wherein an angle of inclination of a weld axis of said weld line, relative to a side surface of said first flywheel is approximately between 5°–60°.

4. A two-mass type of flywheel device according to claim 1, wherein said spring holding plate has a diameter substantially equal to a diameter of said first flywheel, and wherein said weld line is a laser beam generated weld line formed in at least one of directions from a side of said spring holding plate towards said first flywheel and from said first flywheel towards said spring holding plate.

5. A two-mass type of flywheel device according to any one of claims 1 through 4, wherein one end of said friction plate is fitted to said first cylindrical portion and said device further comprises a friction ring urgingly said friction plate into abutment with a friction surface of said first flywheel.

6. A two-mass type of flywheel device according to claim 1, further comprising a push plate riveted to said first flywheel, and a bearing fitted by its outer ring on a second cylindrical portion formed in said first flywheel radially inwardly of said first cylindrical portion and by its inner ring on a hub of said second flywheel, wherein said second cylindrical portion of said first flywheel has a flange axially abutting one end of said bearing, said flange being formed by pressing in continuing relationship with said second cylindrical portion, the other end of said bearing abutting said push plate riveted to said first flywheel.

7. A two-mass type of flywheel device according to claim 1, further comprising:

a driving plate connectible to a crank shaft of an engine of a motor vehicle; and a positioning mechanism for aligning said first flywheel relative to said driving plate;

wherein said positioning mechanism comprises positioning projections, each being a hollow projection protruded from one of said driving plate and said first flywheel near the periphery thereof, each of said hollow projections having a length sufficient to pass through a positioning hole provided in the other of said driving plate and said first flywheel.

8. A two-mass type of flywheel device according to claim 4, further comprising:

a driving plate connectible to a crank shaft of an engine of a motor vehicle;

wherein said driving plate is provided with fixing holes on a periphery thereof, said driving plate being disposed on a side away from said second flywheel relative to said first flywheel; and a ring gear fixed to a side of said spring holding plate together with said driving plate.

9. A two-mass type of flywheel device according to claim 2, wherein an angle of inclination of a weld axis of said weld line relative to a side surface of said first flywheel is approximately between 80°–45°.

* * * * *